(12) United States Patent
Eiter et al.

(10) Patent No.: US 11,547,240 B2
(45) Date of Patent: Jan. 10, 2023

(54) OPERATING A COOKING APPLIANCE

(71) Applicant: BSH Hausgeräte GmbH, Munich (DE)

(72) Inventors: Hans-Martin Eiter, Kirchweidach (DE); Stefan Schürf, Siegsdorf (DE)

(73) Assignee: BSH Hausgeräte GmbH, Munich (DE)

( * ) Notice: Subject to any disclaimer, the term of this patent is extended or adjusted under 35 U.S.C. 154(b) by 41 days.

(21) Appl. No.: 16/493,321

(22) PCT Filed: Mar. 20, 2018

(86) PCT No.: PCT/EP2018/057038
§ 371 (c)(1),
(2) Date: Sep. 12, 2019

(87) PCT Pub. No.: WO2018/188913
PCT Pub. Date: Oct. 18, 2018

(65) Prior Publication Data
US 2020/0069111 A1    Mar. 5, 2020

(30) Foreign Application Priority Data
Apr. 10, 2017 (DE) .................. 10 2017 206 056.5

(51) Int. Cl.
*A47J 36/32* (2006.01)
*F27D 19/00* (2006.01)
(Continued)

(52) U.S. Cl.
CPC .............. *A47J 36/32* (2013.01); *F27D 19/00* (2013.01); *F27D 21/02* (2013.01); *G01N 21/25* (2013.01);
(Continued)

(58) Field of Classification Search
CPC .......... A47J 36/32; F27D 19/00; F27D 21/02; F27D 2019/0003; F27D 2021/026; G01N 21/25
See application file for complete search history.

(56) References Cited

U.S. PATENT DOCUMENTS

| 10,228,145 | B2 | 3/2019 | Erbe et al. |
| 2009/0185163 | A1* | 7/2009 | Shimazu ............... G01N 33/02 356/51 |

(Continued)

FOREIGN PATENT DOCUMENTS

| DE | 102012217350 A1 * | 3/2014 | ............ H05B 6/705 |
| DE | 102014114901 A1 | 4/2016 | |

(Continued)

OTHER PUBLICATIONS

English translation WO2006103138; Zeraschi et al.: "Sensor device comprising a data processing unit for determining the degree of browning"; pp. 1-14; publication date Oct. 2006; download date Dec. 18, 2020. (Year: 2006).*

(Continued)

*Primary Examiner* — Steven N Leff
(74) *Attorney, Agent, or Firm* — Michael E. Tschupp; Andre Pallapies; Brandon G. Braun

(57) ABSTRACT

In a method for operating a cooking appliance, a cooking compartment is irradiated by light of different wavelength ranges. Light reflected in the cooking compartment is measured and measurement results of the light measurement are spectroscopically evaluated. Depending on a result of the spectroscopic evaluation, operation of the cooking appliance is adjusted.

16 Claims, 2 Drawing Sheets

(51) Int. Cl.
*F27D 21/02* (2006.01)
*G01N 21/25* (2006.01)

(52) U.S. Cl.
CPC ............ *F27D 2019/0003* (2013.01); *F27D 2021/026* (2013.01)

(56) References Cited

U.S. PATENT DOCUMENTS

| | | | |
|---|---|---|---|
| 2011/0002677 A1* | 1/2011 | Cochran | A47J 37/0623 |
| | | | 392/416 |
| 2014/0320858 A1* | 10/2014 | Goldring | G01J 3/36 |
| | | | 356/416 |
| 2015/0185138 A1 | 7/2015 | Richardson et al. | |
| 2016/0138857 A1 | 5/2016 | Klingshirn | |
| 2016/0150213 A1* | 5/2016 | Mutti | G06K 9/4604 |
| | | | 348/143 |
| 2016/0283822 A1 | 9/2016 | Imai et al. | |
| 2018/0172510 A1* | 6/2018 | Rosen | G01J 3/0256 |

FOREIGN PATENT DOCUMENTS

| | | |
|---|---|---|
| EP | 0682243 A1 | 11/1995 |
| EP | 2713107 A1 | 4/2014 |
| GB | 2098725 A | 11/1982 |
| JP | S61265429 A | 11/1986 |
| JP | H03144325 A | 6/1991 |
| JP | H05209825 A | 8/1993 |
| WO | 2006103138 A1 | 10/2006 |
| WO | WO-2006103138 A1 * | 10/2006 ............ G01N 21/31 |

OTHER PUBLICATIONS

International Search Report PDT.EP2018/057038 dated Jun. 5, 2018.

* cited by examiner

OPERATING A COOKING APPLIANCE

CROSS-REFERENCES TO RELATED APPLICATIONS

This application is the U.S. National Stage of International Application No. PCT/EP2018/057038, filed Mar. 20, 2018, which designated the United States and has been published as International Publication No. WO 2018/188913 A1 and which claims the priority of German Patent Application, Serial No. 10 2017 206 056.5, filed Apr. 10, 2017, pursuant to 35 U.S.C. 119(a)-(d).

BACKGROUND OF THE INVENTION

The invention relates to a method for operating a cooking appliance, wherein a cooking compartment is irradiated by light of different wavelength ranges and light reflected in the cooking compartment is measured. The invention also relates to a cooking appliance, wherein the cooking appliance is designed to carry out the method and has a cooking compartment, at least one light source for radiating light into the cooking compartment and at least one light sensor for measuring light reflected in the cooking compartment. The invention can be particularly advantageously applied to household cooking appliances, particularly ovens, steamers, microwave ovens and any combination thereof.

WO 2015/059931 A1 discloses a heating cooking device. The heating cooking device comprises a heating chamber which accommodates food, a heating unit which warms the foodstuffs in the heating chamber, an imaging unit which captures the image data of the food once it has been inserted into the heating chamber, a setting unit which accepts a user input in relation to a heating control content which defines a heating operation, a storage unit which stores control information, in which the image data and the heating control content which corresponds to the food specified by the image data are linked, a heat start button which initiates the start of the heating operation, and a storage update unit which links the image data and the heating control content together and updates the control information within the storage unit when the setting unit accepts the user input. The heat start button then initiates the start of the heating operation.

WO 2015/185608 A1 discloses a cooking appliance comprising a cooking compartment with a loading opening which can be closed off by a door, a light pattern projector fixedly arranged in relation to the cooking compartment for generating a light pattern, a camera for recording images from a region which can be irradiated by the light pattern and an evaluation device coupled with the camera for determining a three-dimensional form of an object located in the region which can be irradiated by the light pattern, using a light pattern evaluation, wherein the light pattern projector is arranged so as to radiate a light pattern into the cooking compartment, the camera is fixedly arranged in relation to the cooking compartment, the camera is set up for recording images from a region of the cooking compartment which can be irradiated by the light pattern even in the case of a locked cooking compartment and the evaluation device is set up for repeated calculation of the three-dimensional form of the at least one object located in the region of the cooking compartment which can be irradiated by the light pattern during operation of the cooking appliance.

DE 10 2013 211 097 A1 relates to a refrigeration appliance which comprises a camera module for capturing first image data of refrigerated goods at a first point in time and second image data of refrigerated goods at a second point in time and a freshness determination device for determining the freshness of the refrigerated goods based on the first image data and the second image data.

BRIEF SUMMARY OF THE INVENTION

The object of the present invention is to overcome at least partially the disadvantages of the prior art and in particular to provide an option for determining a content of a cooking compartment of a household cooking appliance in a particularly simple way with high information content. In particular the object is to manage an operation, e.g. a cooking sequence, of the household cooking appliance based on information determined in this way.

This object is achieved according to the features of the independent claims. Preferred embodiment variants may be derived in particular from the dependent claims.

The object is achieved by a method for operating a cooking appliance, wherein a cooking compartment is irradiated with light of different wavelength ranges and light reflected in the cooking compartment is measured, wherein the measurement results are spectroscopically evaluated and an operation, in particular cooking sequence, of the cooking appliance is modified depending on a result of the evaluation.

This method has the advantage of allowing substances in the cooking compartment to be reliably and cost-effectively determined. Such substances can be substances of the cooking appliance itself (e.g. enamel, a catalytic coating etc.), substances adhering to a surface (e.g. soiling such as fat, residual foodstuffs), food to be cooked and/or substances found in a cooking compartment atmosphere (such as steam, substances emitted from food to be cooked etc.).

The cooking appliance is in particular a household cooking appliance. The cooking appliance can comprise an oven functionality, a steam cooking functionality and/or a microwave functionality. The cooking appliance can therefore comprise a conventional oven with steam cooking functionality and/or microwave functionality.

A measurement result can be understood to be a measured value or a measurement variable derived therefrom.

The fact that measurement results are spectroscopically evaluated can in particular mean that the measurement results of different wavelength ranges are considered together or linked. This allows a particularly reliable and diverse detection of the ingredients in a cooking compartment. The spectroscopic evaluation can also be called or regarded as spectral analysis.

The fact that the spectroscopic evaluation can be used to adjust the operation, in particular the cooking sequence, of the cooking appliance depending on a result of the evaluation can also be understood to mean that the cooking appliance can be controlled depending on the spectroscopic evaluation.

The fact that an operation, in particular a cooking sequence, of the cooking appliance is adjusted depending on a result of the evaluation can mean that if an event recognized by the evaluation occurs an action is generally triggered, in particular a cooking sequence is adjusted (e.g. a temperature is increased or reduced, an application of steam is started or stopped, a cooking process is interrupted etc.). The spectroscopic evaluation can furthermore be used to determine or predict a cooking end time. The triggering of the action can also comprise for example an optical and/or acoustic output of a note to a user. The spectroscopic evaluation (in isolation or combined with other methods, e.g. object recognition) also allows automatic recognition of food to be cooked, e.g. with the aim of selecting a suitable cooking program.

In one development the light of different wavelength ranges irradiated into the cooking compartment falls on at least one common measurement surface and the light reflected from this measurement surface is measured by at least one light sensor. The measurement surface can correspond at least partially to a surface of a cooking compartment wall, e.g. a ceiling, a base, a side wall, a rear wall etc. The measurement surface can alternatively or additionally correspond at least partially to a surface of a baffle. The measurement surface can alternatively or additionally correspond at least partially to a surface of a cooking compartment door. The measurement surface can alternatively or additionally correspond at least partially to a surface of a food carrier (e.g. a baking tray or a grill). The measurement surface can alternatively or additionally correspond at least partially to a surface of food to be cooked. Precisely one measurement surface can be used. Alternatively several measurement surfaces spaced apart from one another can be available or used.

Alternatively or additionally the light irradiated into the cooking compartment can be reflected by the atmosphere of the cooking compartment, e.g. by airborne particles, smoke and/or steam.

The light reflected in the cooking compartment can be diffusely and/or specularly reflected light. A light irradiated directly from a light source into a light sensor should however not be taken into consideration.

In a further development the light of different wavelength ranges is generated using a polychrome light source, e.g. a halogen lamp. The spectroscopic evaluation allows light reflected from the surface to be measured selectively in relation to the wavelength ranges (wavelength selectively). For example different photodiodes with different spectral sensitivity ranges can be used for wavelength-selective measurement.

An alternative embodiment irradiates light of different wavelength ranges temporally serially or sequentially onto the measurement surface. This results in the advantage that the measurement requires few light sensors. Particularly for the case in which the light sensor can detect light from all wavelength ranges, only one light sensor can be sufficient depending on the measurement setup.

In another embodiment the measurement results are spectroscopically evaluated and the relationships of their intensities measured on a wavelength-selective basis are determined. In this way ingredients in the cooking compartment can be determined particularly effectively. The group of—if necessary normalized—intensities can also be designated "signature" or "fingerprint". For example a targeted regulation of steam generation is possible using a comparison of a measured intensity for wavelength ranges with high and low water absorption. It is however generally not necessary to identify specific individual substances quantitatively or qualitatively even if this is in principle possible. In a development it can rather be sufficient to detect a signature empirically assigned to a particular and possibly unknown substance, substance mixture, state (state of browning, state of soiling, light scattering capacity etc.) and/or properties of food to be cooked.

In a further embodiment the measurement results are spectroscopically evaluated and changes over time in the intensity relationships are determined (which can also be designated as a comparison over time of intensity relationships). In this way a development of substance, substance mixture, state and/or property of food to be cooked can also be taken into consideration. In particular in this way chemical changes during the cooking process can be observed and with this information a cooking sequence can be managed. Determining changes over time of intensity relationships can include determining changes over time only for one predetermined wavelength range, for several wavelength ranges or for all wavelength ranges. A comparison over time of spectra is therefore also included. The comparison also includes a comparison of changes over time in different wavelength ranges.

In a development the light coming from the cooking compartment is recorded in a spatially resolved manner and is spectroscopically evaluated ("spatially resolved spectroscopy"). This means in particular that properties of the food to be cooked can be monitored at the same time as cooking compartment properties (e.g. soiling etc.). For example several photodiodes which are directed toward different measurement surfaces can be used for spatial resolution.

In a further embodiment the measurement surface is captured on a pixel basis using a camera (which can also be designated as "hyperspectral imaging") and measurement results are each spectroscopically evaluated for several groups of pixels. A spatially resolved spectroscopy is made possible as a result of the wide field of view of a camera. This wide field of view means in particular that properties of the food to be cooked can be monitored at the same time as cooking compartment properties (e.g. soiling etc.). In addition, it is possible to achieve a particularly high accuracy of the spectroscopic evaluation by excluding or not taking into consideration certain image areas which are not of interest. A further advantage of using a camera is that an image taken by the camera can be transmitted to a user. In addition the camera can also be used to perform object recognition.

A spectroscopic evaluation of the measurement results, in particular also changes over time, can for example be carried out via image comparison.

As an alternative or in addition to a camera at least one independent photodiode can be used.

The camera can have at least one semiconductor sensor, e.g. by being configured as a CMOS or CCD camera. An intensity recorded at a pixel can be available in the form of an intensity or brightness value, e.g. in the manner of a grayscale value. For example the intensity value can have 256 different values. A variant of the camera can have individual sensors sensitive to a visible color space (e.g. discrete photodiodes) (e.g. red, green and blue sensitive individual sensors). Additionally or alternatively the camera can have infrared-sensitive, in particular near-infrared-sensitive individual sensors.

The image constructed based on pixels can therefore be split into several—in particular not overlapping—subregions which each have a group of pixels. The subregions are individually spectroscopically evaluated. If a subregion includes several pixels, the associated measured intensities can be added or averaged. If a subregion includes several pixels, a particularly low noise level and/or a particularly low recording duration can be achieved.

An advantageous embodiment for achieving a particularly high spatial resolution is for the respective measurement results for each pixel to be spectroscopically evaluated. In this case each subregion has exactly one pixel.

Another embodiment is for object recognition to be carried out using the camera and a spectroscopic evaluation to be performed depending on the type of recognized object. By this means, several object-specific spectroscopic evaluations can be performed automatically within a short period of time. This allows a particularly user-friendly and reliable operation of the household cooking appliance.

For example a container in which food is to be cooked can be recognized using object recognition in an image taken by the camera and a spectroscopic evaluation relevant to a container in which food is to be cooked is then performed using the associated pixels. In this way, the spectroscopic evaluation allows a material of the container in which food is to be cooked to be recognized. For example if the container in which food is to be cooked is made of plastic and a baking process is to be performed using the household cooking appliance, a warning can be issued to a user and the baking process—if applicable up until a confirmation from a user—is not started or is interrupted. This can be performed in the same way in the case of a microwave oven and a metal container in which food is to be cooked.

Food to be cooked can also be recognized using object recognition in an image taken by the camera and a spectroscopic evaluation relevant to the food to be cooked is then performed using the associated pixels. For example the spectroscopic evaluation can detect a degree of browning, e.g. using spectroscopic detection of chemical processes which occur during browning and/or chemical processes which precede browning, e.g. a drying out of a surface of food to be cooked. As a result of a browning detection a cooking compartment temperature can be adjusted and if applicable a cooking sequence can also be terminated. Detecting the browning and/or drying out allows an early termination of the cooking process in order to achieve a desired browning taking into consideration the residual heat present in the system.

In general the information obtained from the spectroscopic evaluation can support object recognition. Linking both elements of information can therefore be used to achieve higher accuracy during object recognition, for example to recognize food to be cooked or properties of food to be cooked more effectively. For example in the context of object recognition food items or foodstuffs which look similar can be differentiated with greater accuracy using spectroscopic evaluation if the food items have a noticeably different water content.

The spectroscopic evaluation—in particular in the infrared range—and the camera can therefore provide complementary information which can improve recognition options, for example also by limiting the options to specific types of food to be cooked or food items. A procedure for identifying food to be cooked derived from this can deliver results which go beyond the sum of the individual determination methods.

Each of the determination methods offer essentially different, partly complementary options for grouping cooking compartment contents. This means that the spectroscopic evaluation can determine chemically similar substance groups which can be further differentiated based on the different geometric shapes detected during the object recognition.

For example a combination of spectroscopically recognized vegetables and an oven dish recognized optically as an object allows a vegetable bake to be identified. This is particularly advantageous as it is difficult to recognize vegetables using a camera: Vegetables look very different and are chopped in a variety of ways during preparation. As a further example the camera can recognize lots of small objects without sauce on a baking tray using object recognition and vegetables can be recognized using spectroscopic evaluation. A presence of grilled vegetables can then be deduced. As a further example the camera can recognize lots of small objects without sauce on a baking tray using object recognition and dough can be recognized using spectroscopic evaluation. A presence of small baked products can then be deduced.

A cooking compartment wall can also be recognized using object recognition in an image taken by the camera and a spectroscopic evaluation relevant to the cooking compartment wall can then be performed using the associated pixels. For example a soiling or a degree of soiling of the oven muffle can be determined using spectroscopic evaluation. The degree of soiling can for example be detected by the presence of typical soiling substances such as fat. This detection of the degree of soiling can for example be used to issue a note to a user regarding cleaning the cooking compartment, e.g. to carry out a pyrolytic or catalytic self-cleaning. This can be applied in the same way to the baking tray, a baffle and a cooking compartment door.

A presence and a concentration of steam in the cooking compartment can also be determined using spectroscopic evaluation. This allows the addition of steam into the cooking compartment to be precisely controlled. Controlling the addition of steam can in particular lead to an optimum steam saturation in the cooking compartment, which in turn allows energy to be saved on generating steam. A longer period of steam support with a smaller amount of water can be achieved as a result of precise steam control.

In a further embodiment the operation of the cooking appliance is adjusted depending on the result of the spectroscopic evaluation of the object detected by the object recognition and a result of an object evaluation of this object. The combined evaluation or assessment allows a particularly reliable analysis of the substances, states contained in the cooking compartment etc. For example a degree of browning of food to be cooked can also be detected optically via a brightness and/or color analysis. Combining the optical and spectroscopic evaluation allows the degree of browning to be determined particularly precisely. The same can be achieved for example when determining a degree of soiling of a cooking compartment wall based on an optical evaluation and a spectroscopic evaluation. The optical evaluation can for example be performed using a comparison of an intensity of a scattered radiation on a measurement surface compared to a clean measurement surface, the spectroscopic evaluation by determining the presence of and, if applicable, a quantity of fat on the measurement surface.

The household cooking appliance can also have further sensors, the measurement results of which can be used together with the spectroscopic evaluation to control an operation of the household cooking appliance, e.g. to determine or predict a cooking end time more precisely.

In one development a baking sensor is used as a further sensor in particular to be able to determine a cooking end time and/or a degree of browning of food to be cooked (e.g. cakes) particularly precisely.

In another development a core temperature sensor is used as a further sensor in particular to be able to determine a cooking end time and/or a degree of browning of food to be cooked (e.g. pieces of meat) particularly precisely.

In a further embodiment light reflected diffusely from the measurement surface is measured, in particular practically only diffusely reflected light. This allows a particularly low-noise measurement and reliable spectroscopic evaluation. In one development no light path exists which allows an incidence of light from light reflected on the measurement surface into a light sensor.

In a further embodiment at least one wavelength range, in particular several wavelength ranges, if applicable all wavelength ranges are infrared wavelength ranges, in particular near-infrared (NIR) ranges. This is particularly advantageous because many substances in the infrared range, in particular the near-infrared range, show characteristic absorption bands and as a result these substances can be taken into consideration particularly effectively.

In another embodiment the wavelength ranges have at least one visible red range, one visible green range and one visible blue range. Characteristics and changes which can be detected also in the visible range can thereby be taken into consideration. Specifically white mixed light can be generated by simultaneously irradiating red, green and blue light. In this way a light source can also be used for general lighting and/or for object recognition in the visible spectral range.

The object is also achieved by a household cooking appliance, wherein the household cooking appliance is designed as described above to carry out the method. The household cooking appliance may be embodied in an analogous manner to the method and has the same advantages.

The household cooking appliance can for example have a cooking compartment, at least one light source for radiating light into the cooking compartment and at least one light sensor for measuring light reflected in the cooking compartment, wherein the household cooking appliance also has an evaluation device for spectroscopic evaluation of the wavelength-selective measurement results determined by the at least one light sensor and a control device for operating the household cooking appliance, in particular for managing a cooking sequence depending on a result of the evaluation. The evaluation device can be integrated into the control device or the control device can also have an evaluation function.

The at least one light source can comprise at least one halogen lamp. The at least one light source can alternatively or additionally comprise at least one light-emitting diode.

In an embodiment the at least one light source has several light sources which generate light of different wavelength ranges and the household cooking appliance is set up to actuate the light sources of different wavelength ranges temporally serially or in series (e.g. to activate or switch on). In an advantageous development for cost effectively achieving a particularly compact design with clearly definable wavelength ranges the light sources are light-emitting diodes.

In a development during an illumination section over time only the at least one light source of a single wavelength range is illuminated. In an alternative or additional development during an illumination section over time light sources which generate light of different wavelength ranges are illuminated. In this way light also of any color mixture can be irradiated into the cooking compartment. For example red, green and blue images can be taken and can be evaluated individually or as a (white) overlay image. Alternatively the cooking compartment can be illuminated by combined red, green and blue (e.g. white, but if applicable also colored) light, which saves time. In general the cooking compartment can be illuminated with light within the color space which can be spanned by the light sources.

In a further development at least one light source irradiates light in an infrared wavelength range into the cooking compartment. This is particularly advantageous for detecting organic molecules such as for example fats, carbohydrates or proteins. The light source can be a dedicated IR light source.

In another embodiment at least two light sources generate light of different IR wavelength ranges. This enables a particularly reliable detection of organic molecules.

In another embodiment the at least one light sensor has at least one pixel-based detecting camera. The camera can be directed toward one or several measurement surfaces. The camera can be linked to an evaluation device for object recognition and if applicable object evaluation.

BRIEF DESCRIPTION OF THE DRAWINGS

The above-described properties, features and advantages of this invention and the manner in which these are achieved will now be described more clearly and intelligibly with an exemplary embodiment, illustrated in the following schematic description of an exemplary embodiment, which will be described in detail making reference to the drawings.

DETAILED DESCRIPTION OF EXEMPLARY EMBODIMENTS OF THE PRESENT INVENTION

Figure 1:
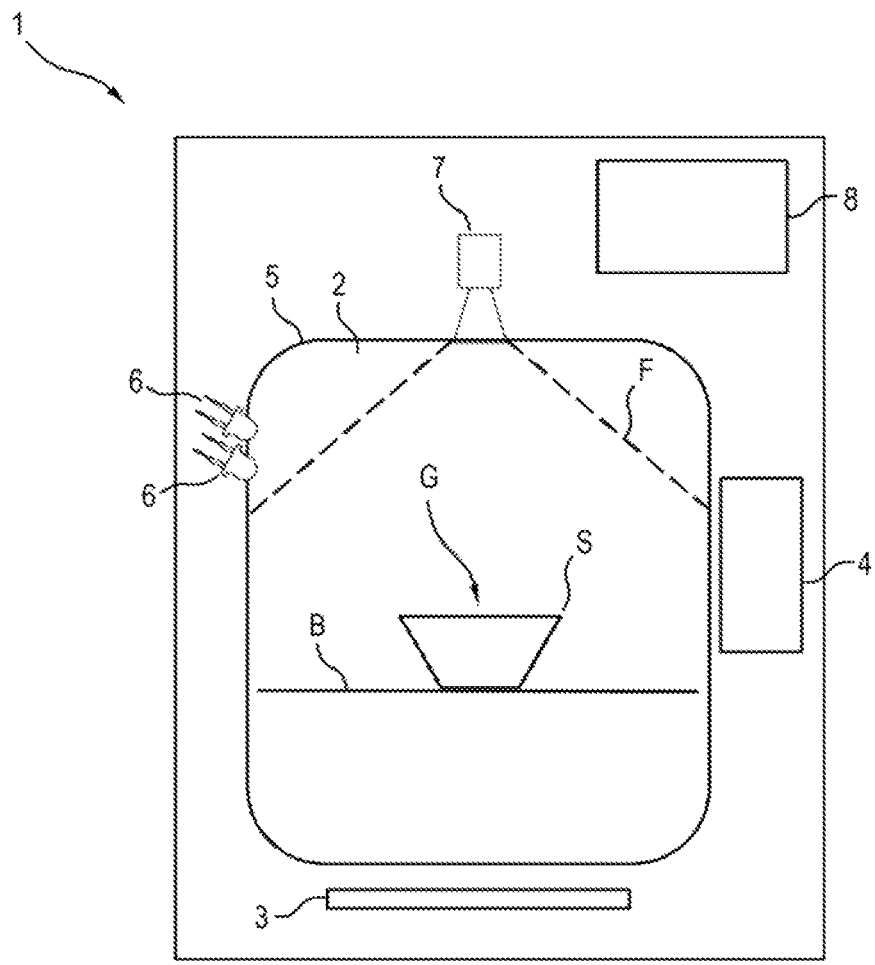
FIG. 1 shows an inventive household appliance.

FIG. 1 shows a household cooking appliance in the form of an oven 1 at least with a steam cooking functionality. For this purpose the oven 1 has a cooking compartment 2 which can be heated using at least one heating device 3. Steam can be applied to the cooking compartment 2 using a steam generation device 4. Food to be cooked G, which is housed in an item of cookware in the form of a dish S, can be inserted in the cooking compartment 2. The dish G is placed on a baking tray B.

The oven 1 furthermore has several light sources in the form of several LEDs 6 inserted behind the cooking compartment wall or oven muffle 5. The LEDs 6 each generate light in different wavelength ranges and essentially at least red, green and blue light as well as near-infrared light in at least two wavelength ranges. At least five LEDs 6 are therefore available which can be actuated separately per wavelength range. The LEDs 6 are in particular arranged behind the oven muffle 5, wherein the light of which falls into the cooking compartment 2 via at least one opening of the oven muffle 5. The at least one opening can be covered by a viewing window (not shown).

The oven 1 also has a light sensor in a ceiling of the oven muffle 5 in the form of a camera 7. A field of view F of the camera 7 is set up vertically here purely by way of example and comprises in this instance parts of the oven muffle 5 as well as the baking tray B with the dish S placed upon it. The camera 7 is set up so as not to receive directly any light emitted from an LED 6 and also no reflection reflex at the oven muffle 5. The camera 7 therefore receives and measures practically only diffusely reflected scattered light. Should however specularly reflected light fall into the camera 7, such a reflection reflex can be detected and suppressed (e.g. hidden).

The camera 7 is connected to a control device 8. The control device 8 is used to control the oven 1, for example to control cooking programs and can therefore for example actuate the heating device 3 and the steam generation device 4. The control device 8 can also actuate the LEDs 6 and the camera 7 and is also used to evaluate the measurement results (images) determined by the camera 7, and namely for object recognition, object evaluation and spectroscopic evaluation. The control device 8 synchronizes among other things the emission of light or light pulses by the LEDs 6 and the image recording by the camera 7 so that the light pulses can be uniquely assigned to the images.

For example the LEDs 6 can be actuated using the control device 8 such that they emit light pulses into the cooking compartment 2 sequentially (temporally serially). The camera 7 is sensitive for all wavelengths and captures a respective image for each LED 6 or for each of the light pulses. The image is constructed on a pixel basis and has a resolution for example of 512×512 or 2048×1024 pixels.

In particular red, green and blue images can be combined into a white image. Using the white image an object recognition can be performed using the control device 8, for example the food to be cooked G, the dish S, the baking tray B and parts of the side wall of the oven muffle 5 can be recognized.

Using the control device 8 the pixels can be spectroscopically evaluated individually, particularly whereby their wavelength-dependent intensities are compared with each other. Additionally or alternatively the variations over time of the intensities and/or intensity relationships can be determined and evaluated.

In this context different objects recognized as a result of image recognition in particular can be separated or spectroscopically evaluated in a variety of ways. For example a container in which food is be cooked (here: the dish S) can be recognized as a plastic dish using object recognition, object evaluation and/or spectroscopic evaluation. For example the oven 1 can issue a warning notice to a user. The warning notice can for example not be issued if the material of the dish is recognized as stoneware or porcelain. A warning can be issued relating to metallic containers in which food is to be cooked prior to a microwave radiation etc.

Object recognition, object evaluation and/or spectroscopic evaluation of the food to be cooked G can also be used to detect a degree of browning, e.g. optically as a result of a color change to darker colors and/or spectroscopically by detecting chemical processes taking place during browning. As a result of such an object recognition and/or spectroscopic evaluation a cooking compartment temperature can be adjusted for example and if applicable a cooking sequence can also be terminated.

Using object recognition and/or spectroscopic evaluation of the oven muffle 5, the degree of soiling of said oven muffle can be determined. The degree of soiling can be detected using object recognition or object evaluation based on a change in the degree of diffuse reflection compared to a clean surface. The soiling can be detected using spectroscopic evaluation by the presence of typical soiling substances such as fat. This can be applied in the same way to the baking tray B or a baffle which is not shown. This detection of the degree of soiling can for example be used to issue a note to a user regarding cleaning the cooking compartment, e.g. to carry out a pyrolytic or catalytic self-cleaning.

A presence and a concentration of steam in the cooking compartment 2 can also be determined using spectroscopic evaluation. This allows the addition of steam into the cooking compartment to be precisely controlled.

In particular the combination of object recognition (and object evaluation) and/or spectroscopic evaluation can significantly increase the recognition accuracy, for example can also improve object recognition.

Figure 2:
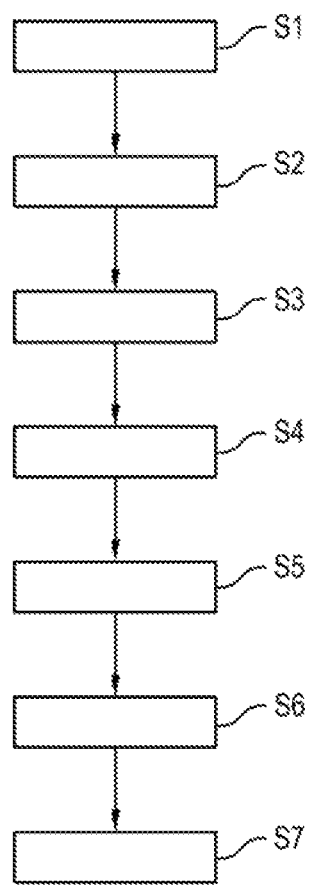
FIG. 2 shows a possible sequence for operating the household appliance.

FIG. 2 shows a possible sequence for operating a household cooking appliance using the oven 1.

In a first step S1 the LEDs 6 are actuated so that they emit light pulses successively with different wavelength ranges (e.g. red, green, blue and twice near-infrared) into the cooking compartment 2, and namely with individual wavelength ranges and/or as a mixture of different wavelength ranges. In this way in particular a measurement surface common to the LEDs 6 can be illuminated.

In a second step S2 images of the cooking compartment 2 are captured using the camera 7, and namely at least one image for each wavelength range. The image detects light reflected from the cooking compartment 2. This can be light reflected on the measurement surface and/or in the atmosphere of the cooking compartment, in particular diffusely reflected light.

In a third step S3 an object recognition is performed using one of the images or a combination of images (e.g. a white light image compiled from red, green and blue light portions).

In a fourth step S4 an object evaluation of the objects detected in the image or images is performed.

In a fifth step S5 a spectroscopic evaluation of the objects detected in the image or images is performed, if applicable also as a temporal sequence together with previously captured images. This evaluation can in particular be performed individually for each pixel.

In a sixth step S6 the optical evaluation and the spectroscopic evaluation are evaluated on a combined basis in order to obtain a result based on both evaluations or assessments.

In a seventh step S7 the oven 1 is operated depending on a result of a combined evaluation.

Naturally, the present invention is not restricted to the exemplary embodiment disclosed.

In this way instead of being on the ceiling of the cooking compartment the light sensor can also be positioned on another wall of the cooking compartment, in particular in one of the corners of the cooking compartment or in the door.

In general, "a", "an", etc. can be understood as singular or plural, in particular in the sense of "at least one" or "one or more", etc., provided this is not explicitly excluded, e.g. by the expression "exactly one", etc.

A numerical value can also include the given value as a typical tolerance range, provided this is not explicitly excluded.

The invention claimed is:

1. A method for operating a cooking appliance, said method comprising:
    irradiating a cooking compartment of the cooking appliance by sequentially emitting a first light pulse of a first wavelength range at a first time and a second light pulse of a second wavelength range at a second time;
    capturing, by a camera, a first image corresponding to the first wavelength range of light reflected in the cooking compartment at the first time and a second image corresponding to the second wavelength range of light reflected in the cooking compartment at the second time;
    optically recognizing, by a control device, a food object within the cooking compartment based on a combined camera image formed using the first image and the second image;
    optically identifying, by the control device, a first pixel subregion associated with the food object;
    optically recognizing, by the control device, a cooking compartment wall within the cooking compartment based on the combined camera image;

optically identifying, by the control device, a second pixel subregion associated with the cooking compartment;

spectroscopically evaluating, by the control device, the first pixel subregion using the first image and the second image;

spectroscopically evaluating, by the control device, the second pixel subregion using the first image and the second image;

determining, by the control device, a degree of browning of the food object based on the optical recognition and the spectroscopic evaluation of the first pixel subregion;

determining, by the control device, a degree of soiling of the cooking compartment wall based on the optical recognition and the spectroscopic evaluation of the second pixel subregion;

automatically controlling the cooking appliance, by the control device, to perform an action based on the degree of browning as determined by a combination of the optical evaluation and the spectroscopic evaluation; and automatically controlling the cooking appliance, by the control device, to perform an action based on the degree of soiling of the cooking compartment wall.

2. The method of claim 1, wherein spectroscopically evaluating includes, for each of one or more subregions of a pixel sensor array of the camera, combining respective intensities sensed by each pixel of the subregion to obtain a combined sensed intensity corresponding to the subregion.

3. The method of claim 1, wherein the camera is positioned to sense predominantly light reflected diffusely in the cooking compartment.

4. The method of claim 1, wherein at least one of the first and second wavelength ranges is an infrared wavelength range.

5. The method of claim 4, wherein the infrared wavelength range includes near-infrared wavelengths.

6. The method of claim 1, further comprising recognizing an object within the cooking compartment as a food container.

7. The method of claim 6, further including identifying a material of the food container based on the spectroscopic evaluation, and wherein automatically controlling the cooking appliance to perform an action includes causing the cooking appliance to stop a cooking process.

8. The method of claim 1, further comprising:
irradiating a cooking compartment of the cooking appliance by sequentially emitting a third light pulse of a third wavelength range at a third time;
capturing, by a camera, a third image corresponding to the third wavelength range;
of light reflected in the cooking compartment at the third time;
wherein the first wavelength range is a visible red range of light, the second wavelength range is a visible blue range of light, and the third wavelength range is a visible green range of light; and
wherein the combined camera image is a white light image formed using the first image, the second image, and the third image.

9. The method of claim 1, wherein the spectroscopic evaluation includes comparing wavelength-dependent pixel intensities.

10. A cooking appliance, comprising:
a cooking compartment including a first wall;
a plurality of light sources, each configured to radiate light pulses of a different respective wavelength range into the cooking compartment;
a light sensor configured to capture at least one image corresponding to each of the wavelength ranges reflected in the cooking compartment, to optically recognize a food object and the first wall of the cooking compartment in the at least one image, and to determine pixels associated with the food object and the first wall of the cooking compartment;
a spectroscopic evaluation device configured to determine a degree of browning of the food object by executing a spectroscopic evaluation of light measured selectively in relation to the wavelength ranges using the pixels associated with the recognized food object, and to determine a degree of soiling of the first wall of the cooking compartment by executing a spectroscopic evaluation of light measured selectively in relation to the wavelength ranges using the pixels associated with the first wall of the cooking compartment; and
a control device configured to control the cooking appliance depending on the degree of browning of the food object as indicated by a result of the combined spectroscopic and optical recognitions and to control the cooking appliance depending on the degree of soiling of the first wall of the cooking compartment as indicated by a result of the combined spectroscopic and optical recognitions;
wherein the control device is configured to actuate the light sources sequentially; and
wherein the control device is further configured to synchronize emission of light by the plurality of light sources and image recording by the light sensor such that each light pulse corresponds to a respective image.

11. The cooking appliance of claim 10, wherein the plurality of light sources are configured to generate light of two or more IR wavelength ranges.

12. The cooking appliance of claim 10, wherein two of the plurality of light sources are configured to generate light of different respective IR wavelength ranges.

13. The cooking appliance of claim 10, wherein the spectroscopic evaluation devices is integrated into the control device.

14. The cooking appliance of claim 10, wherein the plurality of light sources are disposed adjacent the first wall of the cooking compartment and the light sensor is disposed adjacent a second wall of the cooking compartment, such that the light sensor receives only diffusely reflected light.

15. A method of operation of a cooking appliance having a cooking compartment, the method comprising:
capturing a first image of first light reflected in a cooking compartment when the cooking compartment is illuminated by light having a first wavelength range;
capturing a second image of second light reflected in the cooking compartment when the cooking compartment is illuminated by light having a second wavelength range;
identifying a food object within the cooking compartment based on object recognition performed on a combined camera image formed by the first image and the second image;
identifying a cooking compartment wall within the cooking compartment based on object recognition performed on the combined camera image;
determining pixels associated with the food object and with the cooking compartment wall;

spectroscopically evaluating wavelength-dependent intensities corresponding to pixels associated with the food object of the first image and second image;

spectroscopically evaluating wavelength-dependent intensities corresponding to pixels associated with the cooking compartment wall of the first image and the second image;

determining a degree of browning of the food object based on the object recognition and the spectroscopic evaluation;

determining a degree of soiling of the cooking compartment wall based on the object recognition and the spectroscopic evaluation; and automatically controlling the cooking appliance based on the degree of browning and the degree of soiling.

16. The method of claim 15, wherein identifying the food object includes detecting a shape of the food object based on object recognition, the method further comprising identifying a food type of the object based on the detected shape and the spectroscopic evaluation.

* * * * *